United States Patent
Shoemaker, Jr.

(10) Patent No.: US 11,011,029 B1
(45) Date of Patent: May 18, 2021

(54) ARCADE CRANE GAME

(71) Applicant: Stephen P. Shoemaker, Jr., Redondo Beach, CA (US)

(72) Inventor: Stephen P. Shoemaker, Jr., Redondo Beach, CA (US)

(73) Assignee: Stephen P. Shoemaker Trust, Manhattan Beach, CA (US)

(*) Notice: Subject to any disclaimer, the term of this patent is extended or adjusted under 35 U.S.C. 154(b) by 0 days.

(21) Appl. No.: 16/900,544

(22) Filed: Jun. 12, 2020

(51) Int. Cl.
A63F 9/24 (2006.01)
G07F 17/32 (2006.01)
A63F 9/30 (2006.01)
G06K 7/10 (2006.01)
G06K 7/14 (2006.01)

(52) U.S. Cl.
CPC ............ *G07F 17/3297* (2013.01); *A63F 9/30* (2013.01); *G06K 7/10297* (2013.01); *G06K 7/10366* (2013.01); *G06K 7/1413* (2013.01); *G07F 17/3248* (2013.01); *G07F 17/3251* (2013.01); *A63F 2250/146* (2013.01)

(58) Field of Classification Search
CPC .... A63F 9/24; A63F 9/30; A63F 9/305; A63F 9/34; A63F 2250/14; A63F 9/142; A63F 9/144; A63F 9/146; A63F 9/345; A63F 2250/148; A63F 7/00; G07F 17/3209; G07F 17/3297; G07F 17/3251; G07F 17/3253
See application file for complete search history.

(56) References Cited

U.S. PATENT DOCUMENTS

| 2018/0114399 A1* | 4/2018 | Riggles | G07F 17/3246 |
| 2020/0126366 A1* | 4/2020 | Smart | G07F 17/3216 |
| 2020/0134982 A1* | 4/2020 | Dluzen | G07F 17/3251 |

* cited by examiner

Primary Examiner — Omkar A Deodhar
(74) Attorney, Agent, or Firm — Fulwider Patton LLP

(57) ABSTRACT

An arcade-type crane game has a vacuum pick-up device for capturing a target such as a laminated card that has ticket values printed prominently on each side of the card, and moves the captured card to a reader such as a barcode reader or RFID reader to read the card's information, e.g., value. The game then returns the card directly to the playing field, and a ticket dispensing machine delivers the proper number of tickets to the player. The use of cards reduces the space needed to display the targets, and the return of the cards to the playing field means that the proprietor rarely if ever needs to access the targets or the playing field. By placing the card reader inside the playing area, the entire process after capture can be completed in a matter of seconds, from capture to transport to reading to returning and ticket dispensing. The bar code is preferably printed on both sides of the card, so that vacuum pick-up device can acquire the card on the top surface and present the bottom surface of the card to the reader for examination.

7 Claims, 6 Drawing Sheets

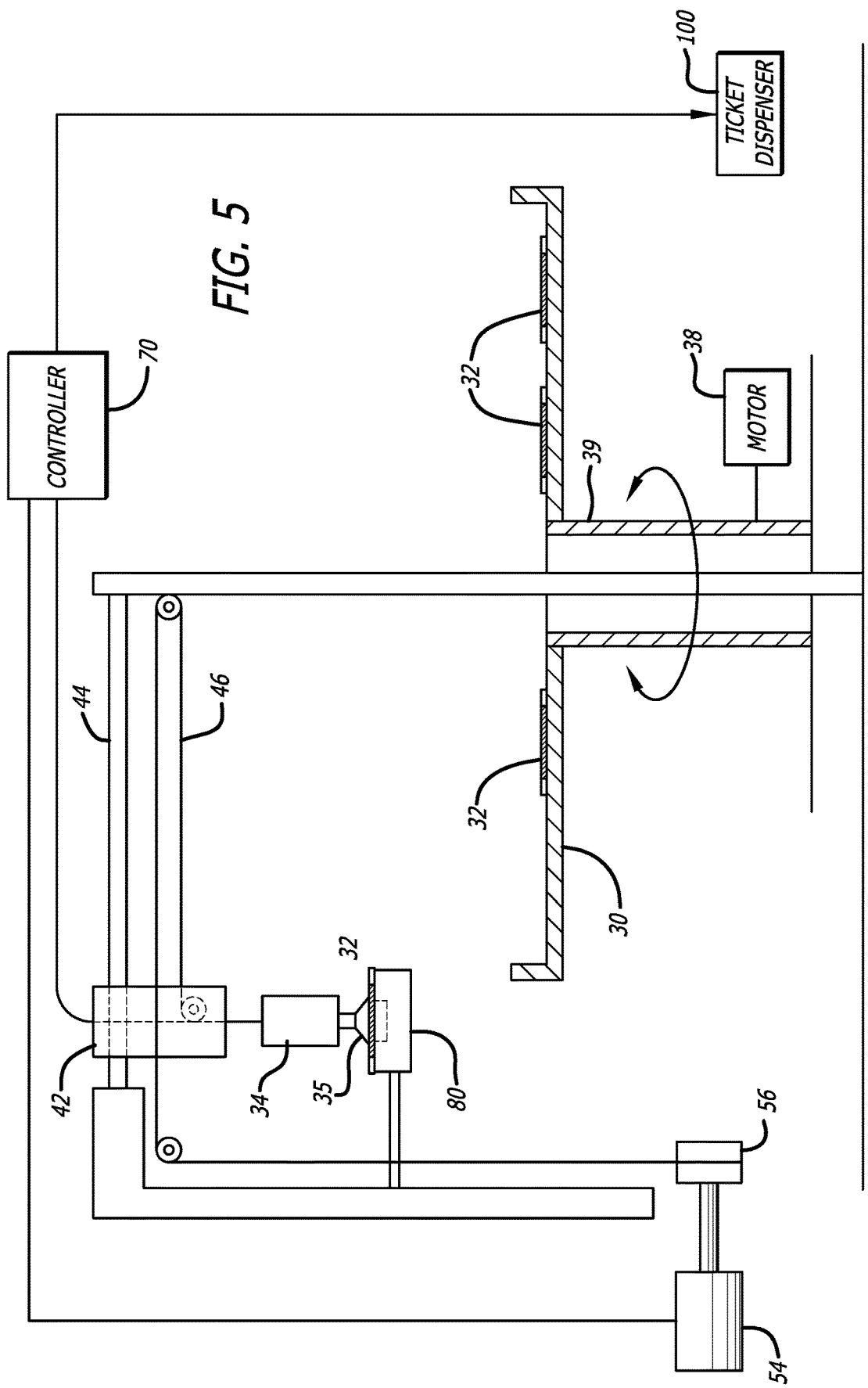

ARCADE CRANE GAME

BACKGROUND

Crane games are found in a variety of places where people gather, from arcades to shopping malls to restaurant waiting rooms and toy stores, and the crane game is always one of the most visually entertaining and popular attractions. In these games, a player pays for a play and controls a pick-up device that can acquire some object within a playing field. In early versions of these crane games, the pick-up device was a mechanical claw that used a cable to collapse its "fingers" around a toy or prize. Plush toys were the most popular prize because they are more easily grasped by the mechanical claw and did not slip through the claw as often as other prizes. The enclosure for such games could typically hold from thirty to fifty plush toys, with a conventional win rate of approximately ten to fifteen percent. For popular games, this leads to the game becoming quickly depleted of prizes, forcing the operator of the game to constantly check the status of the game's inventory and replenish the toys and prizes on a regular basis. This not only shut down the game during the refilling operation, but also imposes a significant time burden on those tasked with monitoring the game.

As crane games advanced, different pick-up devices were developed such as magnets and vacuum devices. These new pick-up devices allowed new categories of prizes to be used in the game, such as metal prizes, boxed toys, cards, jars, and prizes that have smooth surfaces that attach to the vacuum pick up device. However, the problem with prize depletion was still present and crane games needed to be constantly monitored and refilled regardless of the type of prize. U.S. Pat. No. 7,192,342 to Shoemaker Jr. solved the problem of prize depletion by using targets instead of prizes. The targets were acquired by the player using the pick-up device, placed on a ramp that determined the value or type of the target, and redemption tickets were awarded based on the value of the target. The target was then returned to the playing field, where it could be selected by the next player. There is no depletion of the targets in the '342 patent, only the need to refill the redemption tickets periodically. However, todays ticket dispensers can contain tens of thousands of tickets, making the service on these games far lower than prize distribution arcade crane games.

U.S. Pat. No. 9,818,265 advanced the art by using a camera to assist the player in acquiring the target. This improvement also allowed the player to not be adjacent the game while playing. Rather, a player accessing the controls using the internet could play the crane game remotely, and collect a prize locally. This simplified the refilling process, as the game could be located at a convenient location for refilling the game since the physical location was not necessarily in a foot traffic or waiting area.

There are still problems with the service and maintenance of arcade type crane games that exist in the technology today. The present invention is designed to improve the problems associated with the need for continually monitoring and refilling crane games.

SUMMARY OF THE INVENTION

The present invention is a crane game that uses thin cards or other planar targets on a rotating playing field. A vacuum pick-up device is used to capture a target such as a laminated card that has ticket values printed prominently on each side of the card, and the pick-up device moves the captured card to a reader such as a barcode reader or RFID/NFC reader to read the card's information, e.g., value. The game then returns the card directly to the playing field, and a ticket dispensing machine delivers the proper number of tickets to the player, or another device could transfer winnings to a game card. The use of cards reduces the space needed to display the targets, and the return of the card to the playing field means that the proprietor rarely if ever needs to access the targets or the playing field. By placing the card reader inside the playing area, the entire process after capture can be completed in a matter of seconds, from capture to transport to reading to returning and ticket dispensing. The RFID/NFC tag is embedded in the card while the bar code is preferably printed on both sides of the card, so that vacuum pick-up device can acquire the card on the top surface and present the bottom surface of the card to the reader for examination. Any type of card reader will work with the invention, as long as the target can be moved over or onto a scanning device and then promptly returned to the playing field.

These and other features of the invention will best be understood with reference to the accompanying drawings and the detailed description of the invention below.

BRIEF DESCRIPTION OF THE DRAWINGS

FIG. 5 is a side view, partially in cross section, of the pick-up device and card reader cooperating to determine a value of the target.

DETAILED DESCRIPTION OF THE PREFERRED EMBODIMENTS

Figure 1:
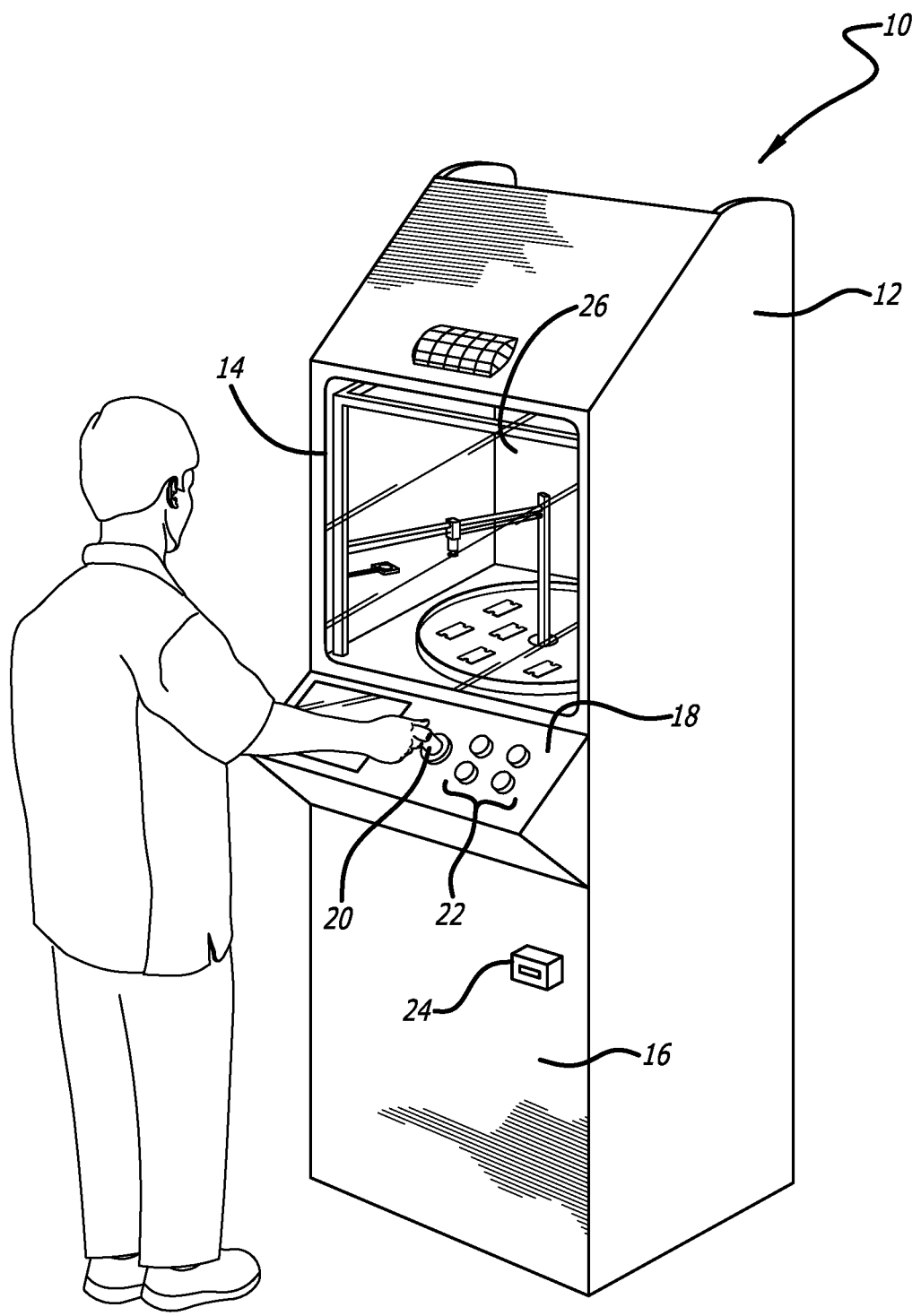
FIG. 1 is an elevated, perspective view of a first embodiment of the present invention.

FIG. 1 illustrates a housing for an arcade crane game of the type embodying the present invention. Game 10 comprises a housing 12 that divides the game into a playing area 14 and a storage compartment 16. The storage compartment can include various elements of the game's essential components, such as a ticket dispenser, motor to drive the rotating playing field, coin or token collection (or payment card reader, paper bill collector, etc.), and electronics for controlling the game including a processor. The housing 12 also includes a player control area 18 where various player controls are located, such as for example a joystick 20 and optional input devices to selecting options for game play. In a first embodiment, the game may dispense redemption tickets through a ticket slot 24 that can be redeemed for prizes, candy, or other items.

The playing area 14 is characterized by an enclosure that has a window 26 through which the player views the operation of the game. Using the joystick 20 or other control means, the player operates a pick-up device that moves over a playing field scattered with targets in the form of cards or other flat items. The targets preferably have a machine readable code printed on at least one surface, such as the bottom surface, or an embedded RFID/NFC tag, that can be read by a scanning device when the card is passed near the scanning device. In a preferred embodiment, the playing field is a continuously rotating turntable that spins about a central axis. With this set up, the pick-up device can access the entire playing field while moving linearly across the rotating playing field, simplifying the player controls to a single linear (forward and backward, left and right, etc.) movement. Alternatively, FIG. 2 illustrates a bi-directional set-up whereby the pick-up device can move in two directions to offer more control over the position of the pick-up device.

Figure 2:
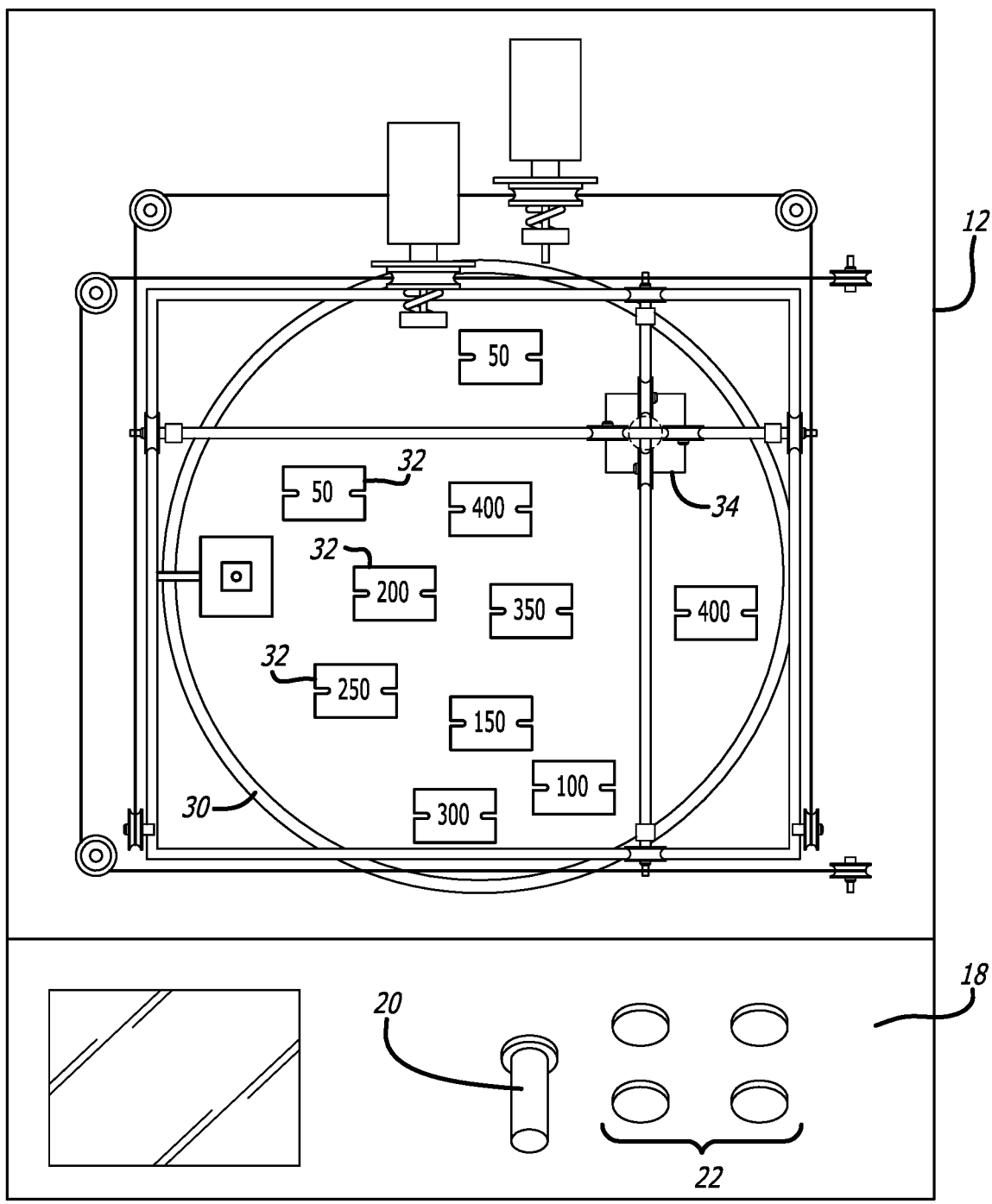
FIG. 2 is a top view of the playing field and the pick-up device carriage system.

In FIG. 2, the rotating playing field 30 inside the playing area is shown from above, and on the playing field 30 is a plurality of targets 32 comprising laminated thin sheets of a rectangular shape with left and right cut-outs at each side. The cut-outs can be used to vary the level of difficulty for acquiring the target 32, as the vacuum pick-up device 34 needs to make contact with the target in a manner in which the suction piece achieves a complete seal with the target's upper surface. If a portion of the suction piece is over the cut-out portion, the seal will not be effected and the pick-up device will not extract the target from the playing field. The operation of the pulley system is described in U.S. Pat. No. 9,539,496 by the present inventor, the content of which is fully incorporated herein by reference, and not repeated here. The player uses the controls 20,22 to move the vacuum pick-up device 34 over the playing field 30 and then lowers the pick-up device in order to attempt to pick up a target 32. If the suction piece makes a complete contact/seal with the target, the pick-up device 34 will capture the target. Otherwise, the pick-up device will return to a home station in preparation for the next attempt.

Figure 3:
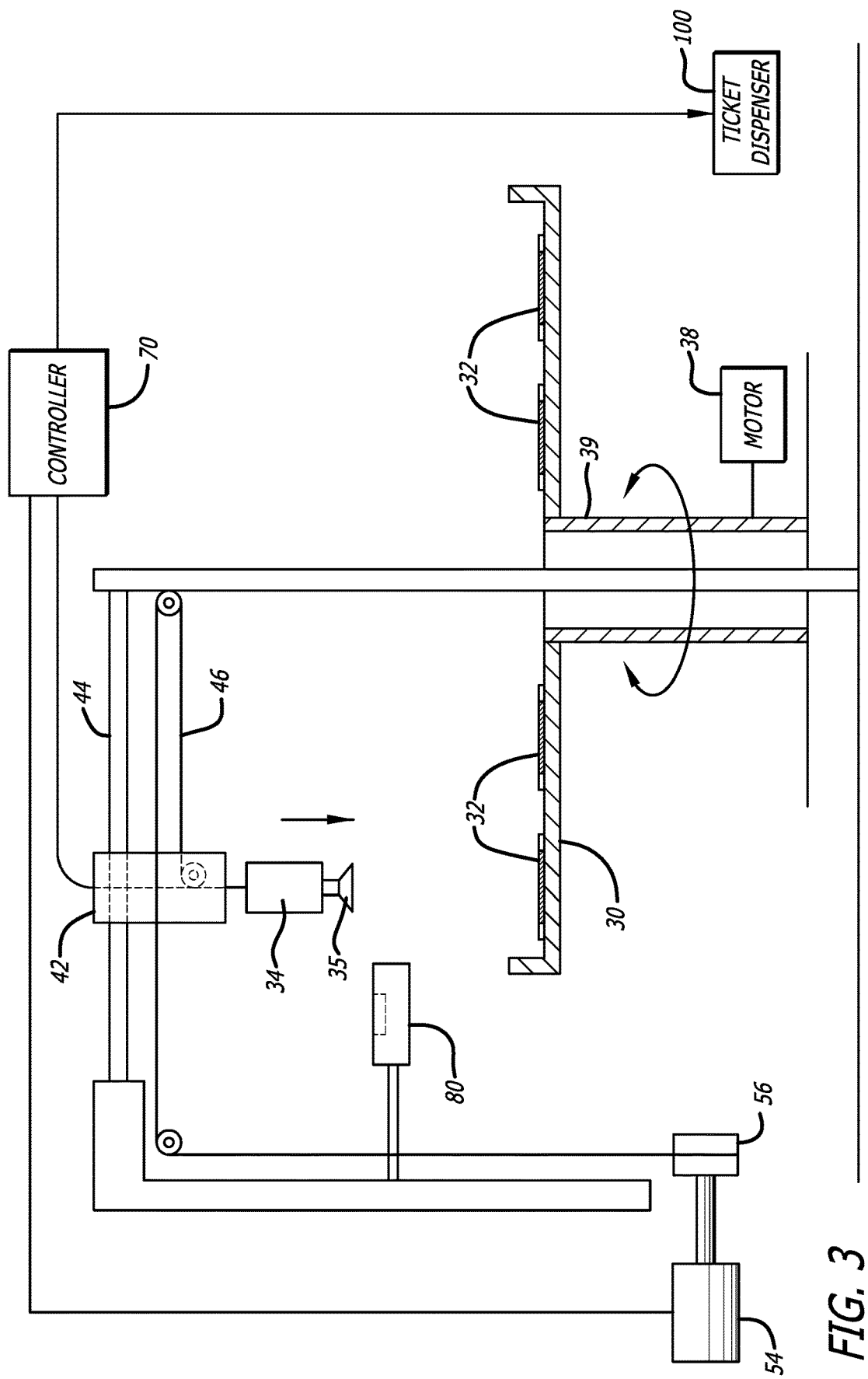
FIG. 3 is a side view, partially in cross section, of the pick-up device and reader of the embodiment of FIG. 1.

FIG. 3 illustrates the game of FIG. 1 in which the pick-up device 34 moves linearly over the playing field 30 as a motor 38 rotates the turntable 39 and playing field 30. The pick-up device 34 has a suction piece 35 and is mounted on a carriage 42 that moves along a rail 44. A cable 46 establishes the elevation of the pick-up device 34 and can be extended or retracted by motor 54 and spool 56, which is managed by the controller 70. The controller is coupled to the player inputs 20,22 to position the vacuum pick-up device both horizontally and vertically as the playing field 30 rotates below it.

Figure 4:
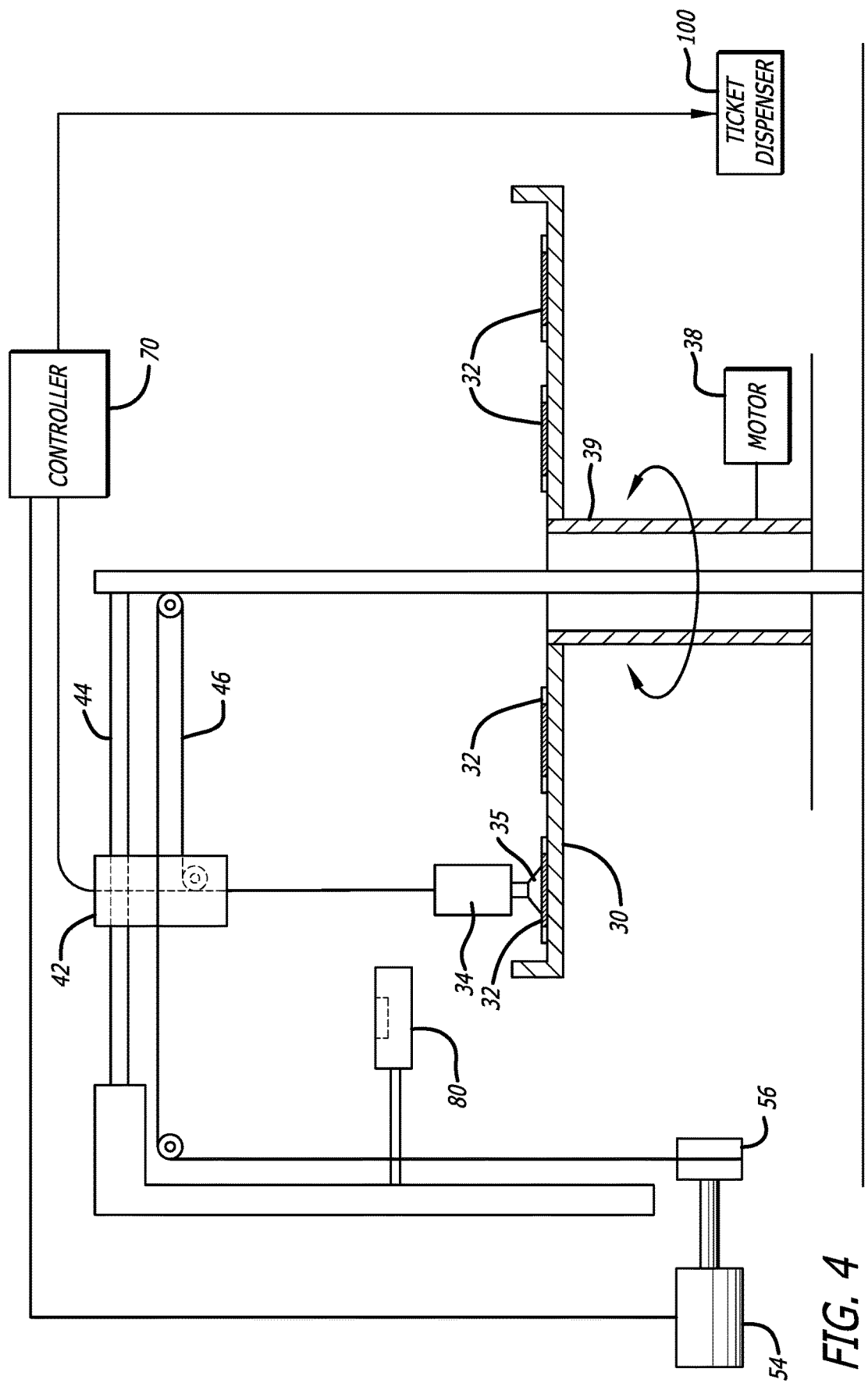
FIG. 4 is a side view, partially in cross section, of the pick-up device capturing a target from the playing field.

Also shown is a scanning device 80, which may be a computer language reader, a barcode reader, RFID/NFC reader, or any other scanning device that can interpret a code on the targets 32. The scanning device 80 is directed upward, so that the pick-up device can move an acquired target over the scanning device without changing the orientation of the target after acquisition. The scanning device is connected to the controller 70, so that when the scanning device reads the code on the target 32, it can signal the ticket dispenser to dispense the tickets associated with the particular acquired target. Once the scanned device reads the target 32, the pick-up device moves the target back over the playing field 30 and releases the target so that it may be reused in the next game/attempt. The targets are never depleted, and the playing field always maintains the same attractive number of targets spread over the playing field. FIGS. 4 and 5 show the pick-up device acquiring the target and then moving the target over the scanning device while sending a signal to the controller and the ticket dispenser.

Figure 6A:
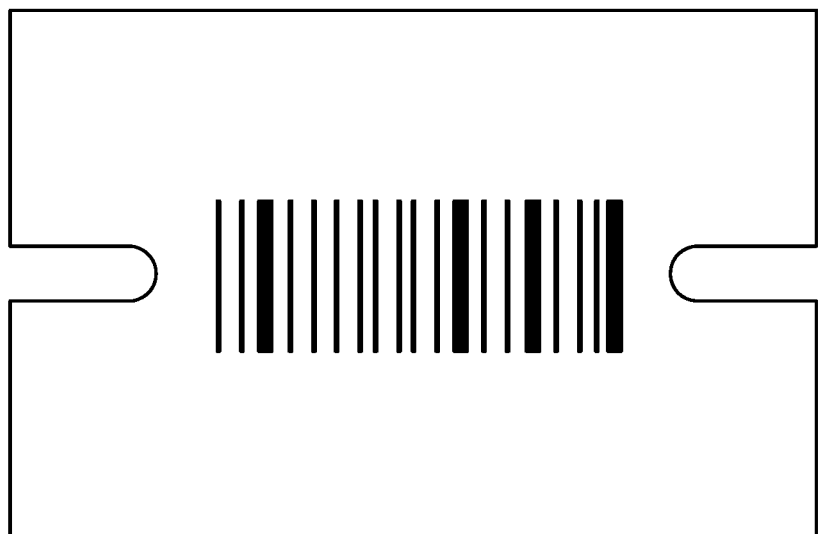
FIGS. 6A and 6B are examples of cards with computer readable coding.
Figure 6B:
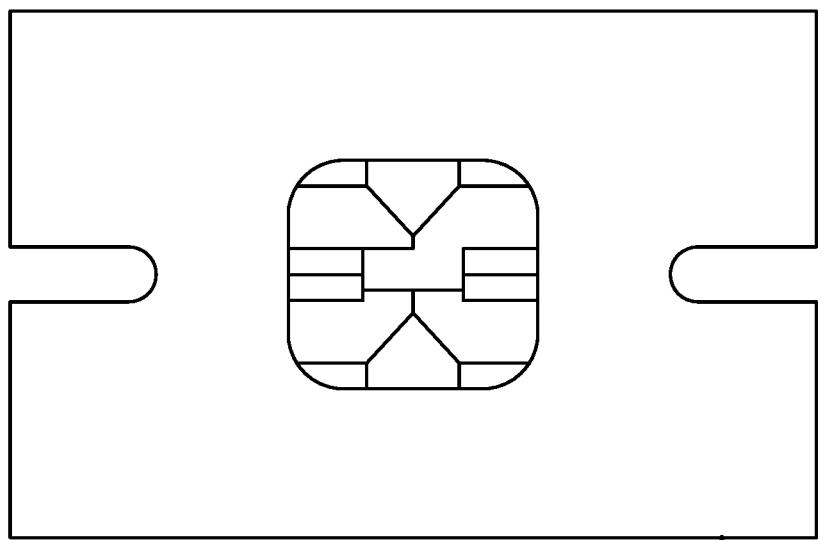

FIGS. 6A and 6B are examples of different bar codes or machine language that the scanner can use to interpret the value of the target. The bar code of FIG. 6A or the graphic code of FIG. 6B is located on the bottom of the target 32 and read by the scanning device 80 as the target is passed over the scanning device. The target can include other graphics that the player can understand to indicate the value of the target, such as that shown in FIG. 2. In one example, the target has graphics showing the value of the target on the upper side and machine language such as that shown in FIGS. 6A and 6B on the bottom side.

The foregoing examples are intended to be illustrative but not exclusionary to other variations of the game. For example, the scanning device may read an RFID or other signaling device instead of a passive code, and the targets may be various shapes besides those shown herein. Accordingly, the present invention should not be limited by the figures and the descriptions herein where a person of ordinary skill in the art would readily recognize modifications and substitutions that do not alter the essence of the game, but rather the scope of the invention is properly measured by the appended claims.

I claim:

1. An arcade crane game, comprising:
   a housing defining a storage area and an enclosure for a playing field;
   a playing field on which a plurality of targets reside, the targets including a scannable indicator that corresponds with a value of the target;
   a pick-up device adapted to acquire a target from the playing field and transfer the target to a second location;
   a scanning device located at the second location for reading the scannable indicator on the target and sending a signal to a controller;
   a prize awarding device actuated by the controller to dispense a prize corresponding with the value of the target;
   wherein an orientation of the target on the playing field and an orientation of the target when the scanning device reads the scannable indicator is the same; and
   wherein the pick-up device returns the target to the playing field for subsequent use without intervention by an operator.

2. The arcade crane game of claim 1, wherein the target is a card.

3. The arcade crane game of claim 2, wherein the card includes a bar code on a first surface, the bar code serving as the scannable indicator.

4. The arcade crane game of claim 2, wherein the card includes a machine readable graphic, the machine readable graphic serving as the scannable indicator.

5. The arcade crane game of claim 1, wherein the pick-up device is a vacuum pick-up device.

6. The arcade crane game of claim 1, wherein the prize awarding device is a ticket dispenser.

7. The arcade crane game of claim 1, wherein the prize awarding device is a card reading/writing system for storing player and game information.

* * * * *